(12) United States Patent  
Schultz

(10) Patent No.: US 7,793,542 B2  
(45) Date of Patent: Sep. 14, 2010

(54) CADDIE-CORNER SINGLE PROOF MASS XYZ MEMS TRANSDUCER

(75) Inventor: Peter S. Schultz, Phoenix, AZ (US)

(73) Assignee: Freescale Semiconductor, Inc., Austin, TX (US)

(*) Notice: Subject to any disclaimer, the term of this patent is extended or adjusted under 35 U.S.C. 154(b) by 363 days.

(21) Appl. No.: 11/966,087

(22) Filed: Dec. 28, 2007

(65) Prior Publication Data

US 2009/0165558 A1    Jul. 2, 2009

(51) Int. Cl.
  *G01P 15/00* (2006.01)
  *G01P 15/125* (2006.01)
(52) U.S. Cl. .................. 73/510; 73/514.32; 73/514.29
(58) Field of Classification Search .................. 73/510, 73/511, 514.32, 514.36, 514.38, 514.29
  See application file for complete search history.

(56) References Cited

U.S. PATENT DOCUMENTS

| | | | | |
|---|---|---|---|---|
| 5,894,090 A | * | 4/1999 | Tang et al. | 73/504.02 |
| 5,894,091 A | * | 4/1999 | Kubota | 73/504.12 |
| 6,584,845 B1 | * | 7/2003 | Gutierrez et al. | 73/514.15 |
| 6,845,670 B1 | | 1/2005 | McNeil et al. | |
| 6,936,492 B2 | | 8/2005 | McNeil et al. | |
| 6,990,864 B2 | * | 1/2006 | Sakai | 73/514.32 |
| 7,367,232 B2 | * | 5/2008 | Vaganov et al. | 73/514.33 |
| 7,398,683 B2 | * | 7/2008 | Lehtonen | 73/514.32 |

* cited by examiner

*Primary Examiner*—Helen C. Kwok
(74) *Attorney, Agent, or Firm*—Michael J. Balconi-Lamica

(57) ABSTRACT

A three-axis MEMS transducer featuring a caddie-corner proof mass comprises a planar main body portion of conductive material and a planar extra mass caddie-corner feature. The main body portion includes a width, length, and at least four side edges. An x-axis sense direction is defined from a first side edge to an opposite first side edge and a y-axis sense direction is defined from a second side edge to an opposite second side edge. The x-axis sense direction is perpendicular to the y-axis sense direction. The main body portion further includes at least two corners. The caddie-corner feature is positioned about at least one of the two corners of the main body portion. The caddie-corner feature and the main body portion comprise a single proof mass having a z-sense pivot axis disposed at an angle of ninety degrees to a diagonal extending from the caddie-corner feature to an opposite corner of the main body portion. The proof mass is configured to teeter-totter corner to corner about the z-sense pivot axis in response z-axis acceleration and/or z-axis deceleration.

20 Claims, 5 Drawing Sheets

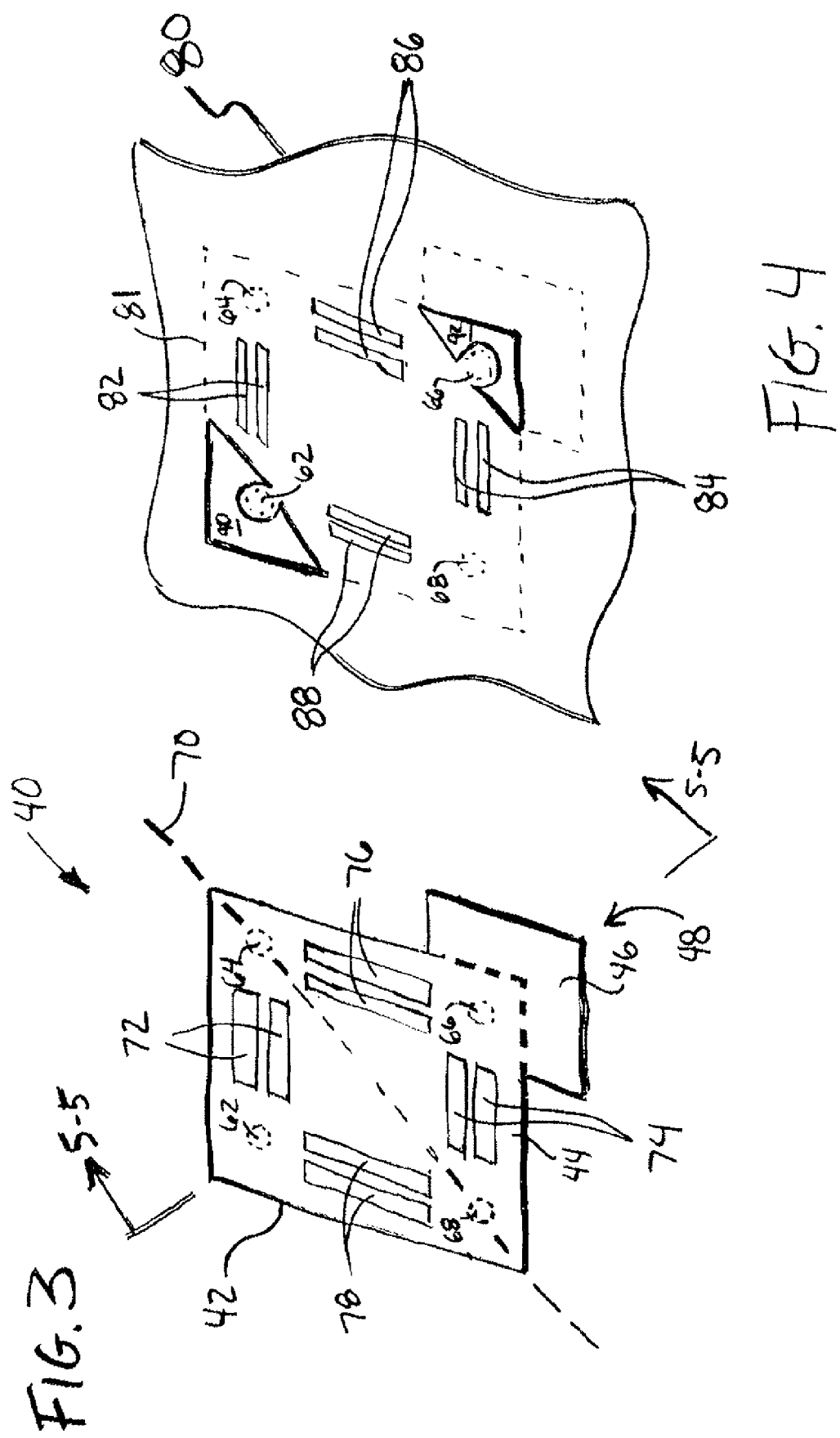

CADDIE-CORNER SINGLE PROOF MASS XYZ MEMS TRANSDUCER

BACKGROUND

1. Field

This disclosure relates generally to accelerometers, and more specifically, to a caddie-corner single proof mass three-axis (XYZ) micro electromechanical system (MEMS) transducer.

2. Related Art

FIG. 1 is a perspective view diagram of a portion 10 of a three-axis (XYZ) transducer/accelerometer having a known rectangular shaped proof mass 12. The rectangular shaped proof mass 12 is characterized by width and length dimensions, indicated by reference numerals 14 and 16, respectively. A portion of proof mass 12 along the length dimension 16 comprises an extended portion 18, wherein the extended portion extends along the total width 14. Extended portion 18 provides for an added weight to the proof mass 12 for the z-sense direction.

The proof mass 12 is coupled to a plurality of springs, as indicated by reference numerals 20, 22, 24, and 26. The springs couple to an underlying substrate (not shown) and allow movement of the proof mass 12 in the X, Y, and Z directions. The springs are generally located within a main region of the proof mass 12 defined by the width dimension 14 and by a portion of the length dimension 16 not including the extended portion 18. The three axes X, Y, and Z are indicated by reference numerals 28, 30, and 32 respectively. Plus (+) and minus (−) signs have been illustrated to indicate an example of a positive or negative direction with respect to a given acceleration force along a respective sense axis.

The current proof mass design suffers from several shortfalls. For example, the current proof mass is limited in its z-sense axis roll-off frequency, and its larger overall g-cell area/size. It's linearity may also be able to be improved upon. In addition, the z-sense pivot axis is not well defined, wherein the z-sense pivot axis is more of a virtual sense pivot axis, indicated by reference numeral 34, which is subject to changing its position, for example, within a range from the axis indicated by reference numeral 36 to the axis indicated by reference numeral 38. Such a virtual z-sense pivot axis is undesirable.

Accordingly, there is a need for an improved method and apparatus for overcoming the problems in the art as discussed above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 is a perspective view diagram of the caddie-corner signal proof mass of FIG. 2 illustrating further detail according to one embodiment of the present disclosure;

FIG. 4 is a perspective view diagram of an underlying substrate and sense plates according to one embodiment of the present disclosure;

DETAILED DESCRIPTION

With the embodiments of the present disclosure, the caddie corner single proof mass provides improvements including, for example, improved linearity, greater z-sense axis roll-off frequency (on the order of an improved roll-off frequency approximately eight percent (8%) higher that obtainable with the prior known proof mass), more well defined and stable z-sense pivot axis (i.e., less of a virtual z-sense pivot axis), and generally smaller overall g-cell area/size (i.e., approximated to be on the order of 20% smaller as determined from modeling as well), as will be understood from the discussion of the embodiments herein.

As used herein, the term "semiconductor substrate" can be any semiconductor material or combinations of materials, such as gallium arsenide, silicon germanium, silicon-on-insulator (SOI), silicon, monocrystalline silicon, the like, and combinations of the above.

Figure 1:
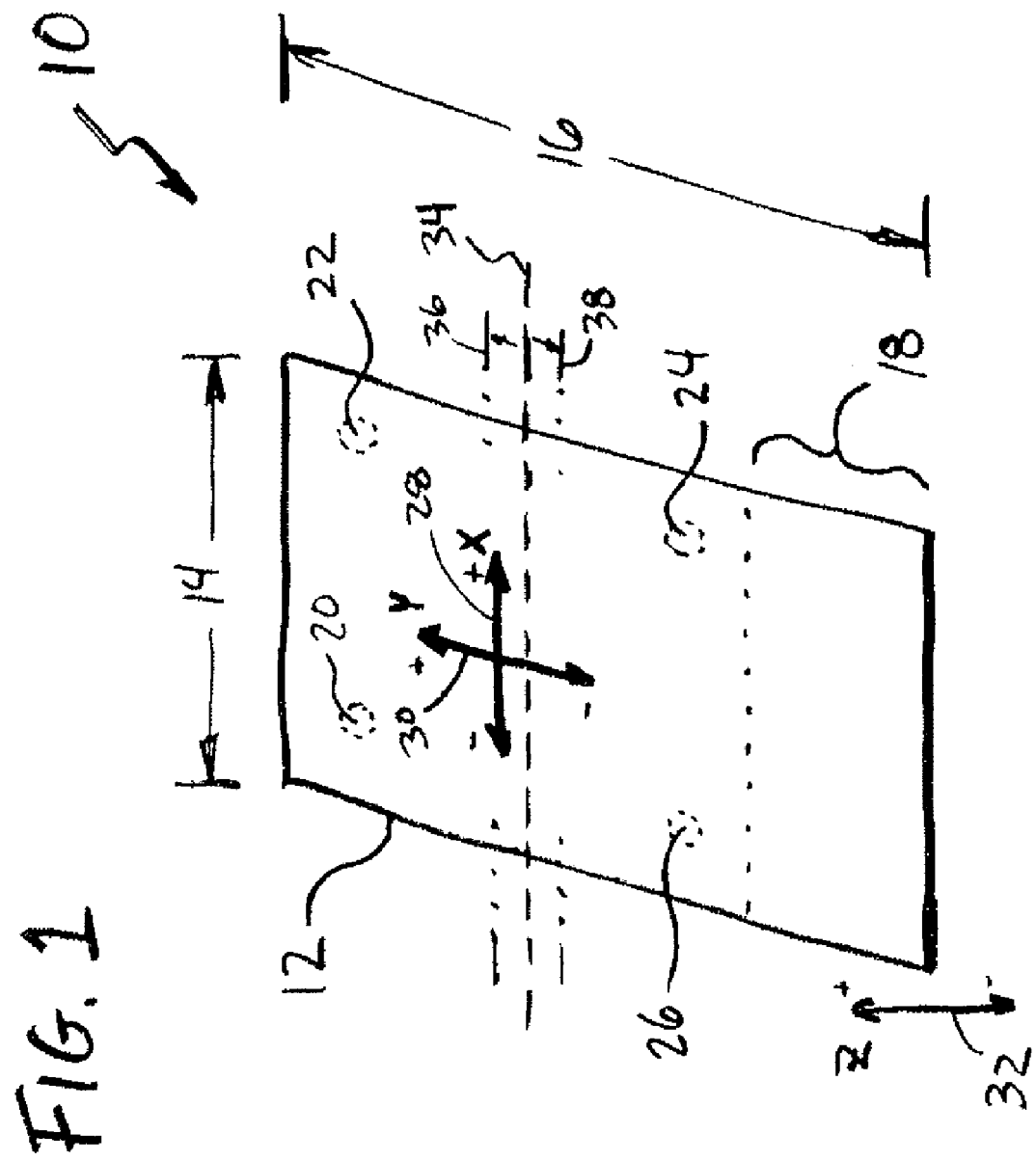
FIG. 1 is a perspective view diagram of a portion of a three-axis accelerometer having a known rectangular shaped proof mass.
Figure 2:
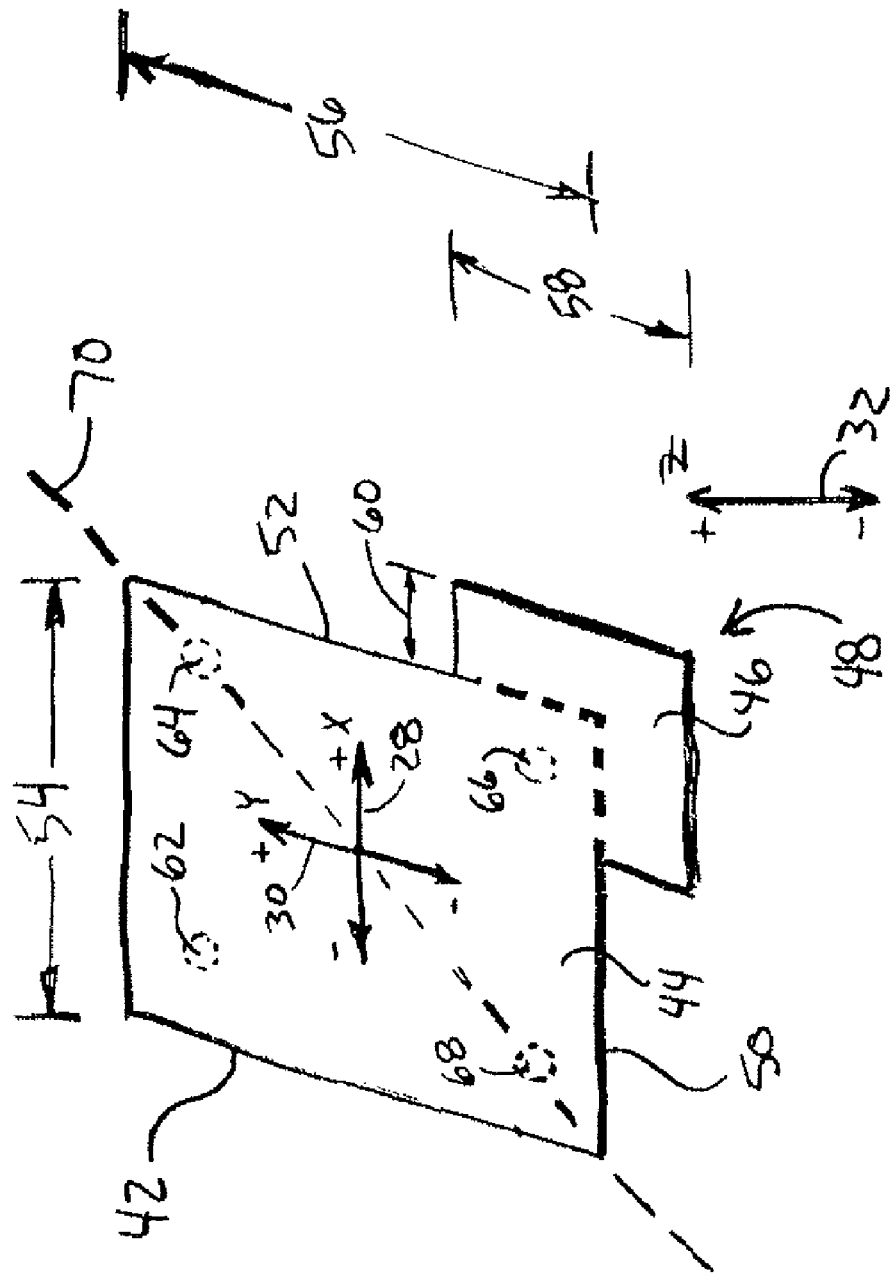
FIG. 2 is a perspective view diagram of a portion of a three-axis (XYZ) MEMS transducer/accelerometer having a caddie-corner single proof mass according to one embodiment of the present disclosure.

FIG. 2 is a perspective view diagram of a portion 40 of a three-axis (XYZ) MEMS transducer/accelerometer having a caddie-corner single proof mass 42 according to one embodiment of the present disclosure. Proof mass 42 includes a main body portion of a conductive material, generally indicated by reference numeral 44, and an extra mass caddie-corner portion, generally indicated by reference numeral 46 positioned about a corner 48 of the proof mass 42. The conductive material can comprise any suitable conductive material selected according to the requirements of a give MEMS transducer/accelerometer implementation. The extra mass caddie-corner portion 46 includes more of the same conductive material of the main body portion 44, and spans a corner between a first side edge 50 and a second side edge 52 of proof mass 42. The extra mass caddie-corner portion 46 may further comprise additional material, as illustrated and discussed with respect to FIG. 5 herein and further wherein the additional material may comprise added mass instead of, or in addition to, the extended area 46 of the proof mass. Extra mass caddie-corner portion 46 provides for an added weight to the proof mass 42 in a corner thereof for z-sense, wherein z-axis sensing occurs diagonally from corner to corner, as will be explained further herein.

The generally square shaped proof mass 42 with a caddie-corner added mass feature 46 is characterized by width and length dimensions, indicated by reference numerals 54 and 56, respectively. In one embodiment, width and length dimensions 54 and 56, respectively, are of substantially equal length. The caddie-corner added mass feature 46 extends in a direction along an adjacent side edge 52 of proof mass 42 by an amount generally indicated by reference numeral 58. Similarly, the caddie-corner added mass feature 46 extends in a direction along an adjacent side edge 50 of proof mass 42 by a similar amount. In addition, caddie-corner added mass feature 46 extends from the adjacent side edges 50 and 52 of proof mass 42 by an amount generally indicated by reference numeral 60. In one embodiment, the dimension 58 is on the order of less than approximately one-half the dimension of either dimension 54 or 56. In a further embodiment, the dimension 60 is on the order of less than approximately one-third the dimension of either dimension 54 or 56. In a still further embodiment, the z-axis additional mass may be the only thing on the corner 48, and may not extend past the side edge (50 or 52) of the main body portion 44 of the proof mass.

The proof mass 42 is coupled to a plurality of springs, as indicated by reference numerals 62, 64, 66, and 68. The springs couple to an underlying substrate (shown in FIG. 4) and allow movement of the proof mass 42 in the X, Y, and Z directions. The springs are generally located within a main region 44 of the proof mass 42 defined by the width dimension 54 and by the length dimension 56. The three axes X, Y, and Z are indicated by reference numerals 28, 30, and 32 respectively. Plus (+) and minus (−) signs have been illustrated to indicate an example of a positive or negative direction with respect to a given acceleration force along a respective sense axis.

The proof mass 42 according to the embodiments of the present disclosure comprises a design for a single mass XYZ transducer used for sensing acceleration along three sense axes. The proof mass according to the embodiments of the present disclosure is configured to produce a teeter-totter effect for the z-sense axis, wherein sensing occurs diagonally from corner to corner in contrast to sensing edge to edge along the Y axis sense direction. The teeter-totter effect occurs about the z-sense pivot axis 70, which is better defined corner to corner through the positional locations of springs 64 and 68. In particular, z-sense pivot axis 70 is defined through the corners opposite to those of the caddie-corner added mass feature 46.

The proof mass design according to the embodiments of the present disclosure shares extra mass 46 used by Z-sense axis in both the X and Y directions about a corner of the proof mass and enables placement of extra mass farther from the center of proof mass. The caddie-corner proof mass design also provides the three-axis MEMS transducer/accelerometer device with a number of performance improvements. The performance improvements include, but are not necessarily limited to, improved linearity, greater z sense axis roll-off frequency, less of a virtual pivot (corresponding to a more well defined z-sense pivot axis), and smaller overall g-cell area/size. In particular, the z-sense pivot axis 70 is more well defined corner to corner through the positional locations of springs 64 and 68, on corners opposite to those of the caddie-corner added mass feature 46.

FIG. 3 is a perspective view diagram of the caddie-corner signal proof mass 42 of FIG. 2 illustrating further detail according to one embodiment of the present disclosure. The proof mass 42 includes at least two sets of y-sense axis openings 72 and 74 and at least two sets of x-sense openings 76 and 78. FIG. 4 is a perspective view diagram of an underlying substrate 80 and sense plates according to one embodiment of the present disclosure. Reference numeral 81 refers to a dashed line which indicates an outline of the caddie-corner proof mass 42. When assembled, the caddie-corner proof mass 42 is disposed over substrate 80, in the region generally indicated by outline 81. Note the locations for attachment or coupling of the springs 62, 64, 66, and 68 to the substrate 80; however, as this is one example, it should be noted that the specific number of springs is not limited in number and/or placement.

Substrate 80 includes at least two sets of y-axis sense plates 82 and 84. Substrate 80 further includes at least two sets of x-axis sense plates 86 and 88. Y-axis sense plates 82 and 84, as well as x-axis sense plates 86 and 88 are disposed upon raised portions of the substrate or other suitable layers (not shown). Accordingly, placement of the caddie-corner proof mass 42 over substrate 80 results in y-axis sense plates 82 and 84 being positioned within corresponding y-sense axis openings 72 and 74, respectively. Placement of the caddie-corner proof mass 42 over substrate 80 also results in x-axis sense plates 86 and 88 being positioned within corresponding x-sense axis openings 76 and 78, respectively. Furthermore, substrate 80 includes first and second z-axis sense plates 90 and 92, wherein the z-axis sense plates are positioned proximate opposite corners, and further wherein sense plate 92 is positioned on substrate 80 under the region of corner 48 of proof mass 42, proximate caddie-corner feature 46. While not illustrated, suitable electrical connections and control components are provided, as needed, for implementing a three-axis accelerometer using the caddie-corner proof mass 42 according to the embodiments of the present disclosure.

Figure 5:
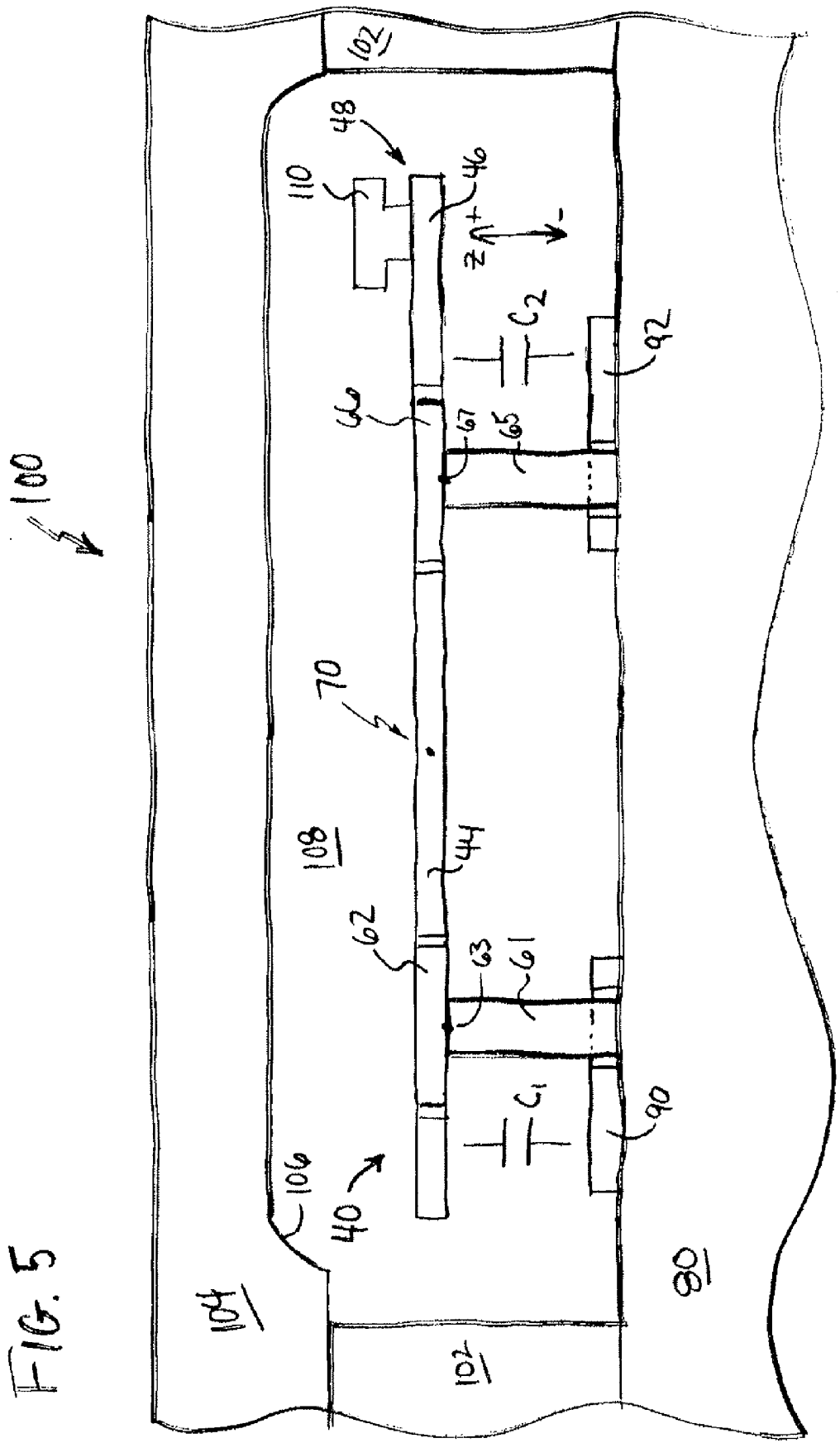
FIG. 5 is a cross-sectional view of a portion of a three-axis MEMS transducer/accelerometer, taken along line 5-5 of FIG. 3, featuring the caddie-corner single proof mass according to one embodiment of the present disclosure.

FIG. 5 is a cross-sectional view of a portion 100 of a three-axis MEMS transducer/accelerometer, taken along line 5-5 of FIG. 3, featuring the caddie-corner single proof mass 40 according to one embodiment of the present disclosure. As illustrated in FIG. 5, z-axis sense plates 90 and 92 are disposed overlying substrate 80. Caddie-corner single proof mass 40 is suspended over substrate 80 via four springs (62, 64, 66 and 68) and corresponding pedestals, only two of which are shown and indicated by reference numerals 61 and 65. Spring 62 is attached to pedestal 61, for example, at a location indicated by reference numeral 63. Similarly, spring 66 is attached to pedestal 65, for example, at a location indicated by reference numeral 67. Note that the z-sense pivot axis is centrally located within the main body portion 44 as indicated by reference numeral 70. In response to a z-axis acceleration or deceleration, the proof mass teeter-tooters substantially about z-sense pivot axis 70 by an amount proportional to the z-axis acceleration. The z-axis acceleration is determined as a function of the capacitance C1 and capacitance C2. Capacitance C1 is formed between the proof mass 42 and the z-axis sense plate 90. Capacitance C2 is formed between the proof mass 42 and the z-axis sense plate 92.

Referring still to FIG. 5, a spacer material 102 is provided about the portion 40 of the three-axis transducer/accelerometer. In one embodiment, the spacer material 102 comprises frit glass. In addition, a suitable cover 104 having a microcavity 106 is coupled to the spacer material 102 and disposed overlying the portion 40 of the three-axis transducer/accelerometer. As a result, a cavity 108 is formed, thereby hermetically sealing the portion 40 within a controlled environment. The cavity 108 can be filled with any suitable material (e.g., gas) or lack thereof (e.g., vacuum), according to the requirements of a given three-axis transducer/accelerometer application. Furthermore, the caddie-corner feature 46 may include additional mass, such as indicated by reference numeral 110. Additional mass 110 can comprise any material which does not have any adverse effect(s) upon other elements of the three-axis transducer/accelerometer 100. The additional mass 110 is added during fabrication of the proof mass 42. The amount of additional mass 110 can comprise a single additional mass or multiple ones of additional mass and can further be selected according to the requirements of a given three-axis transducer/accelerometer application or implementation.

Figure 6:
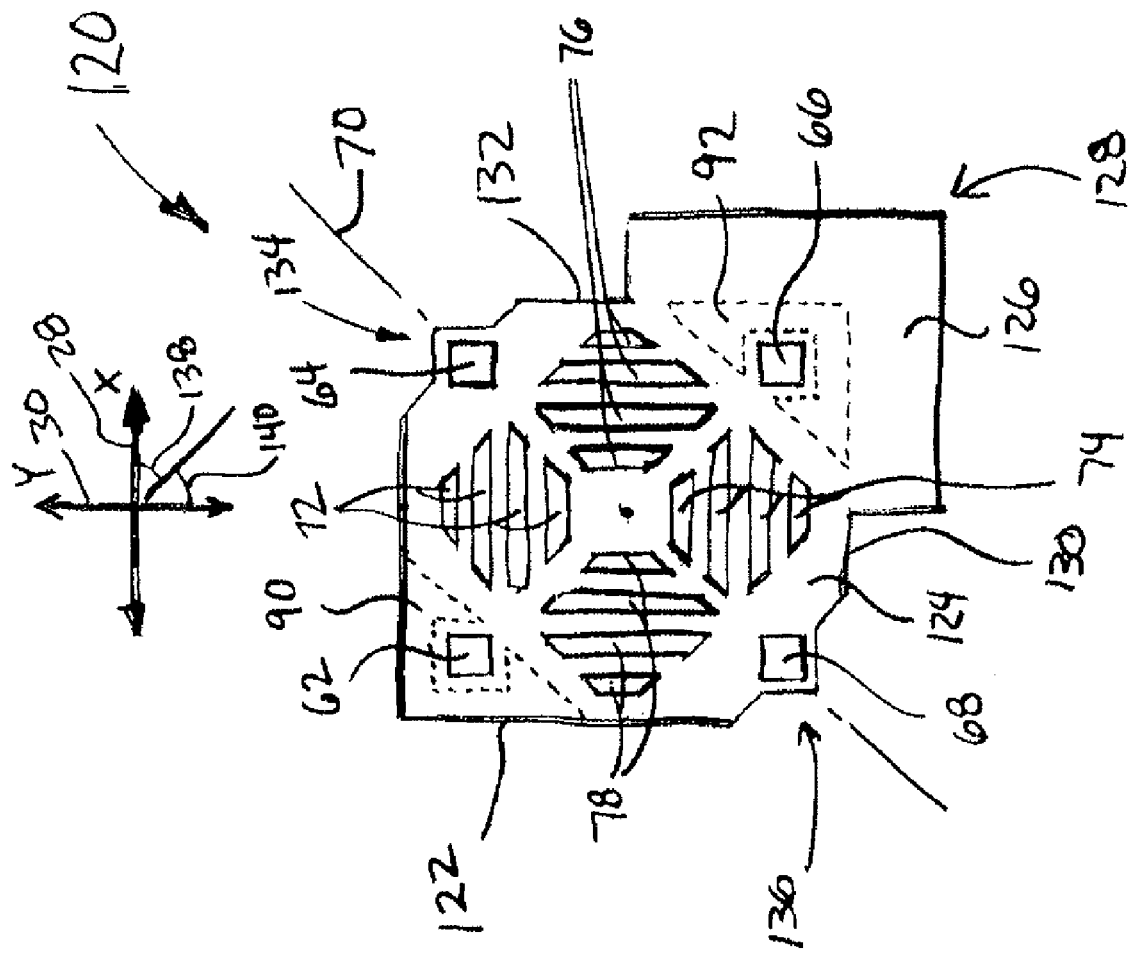
FIG. 6 is a top view diagram of a portion of a three-axis (XYZ) MEMS transducer/accelerometer having a caddie-corner signal proof mass according to another embodiment of the present disclosure.

FIG. 6 is a top view diagram of a portion 120 of a three-axis (XYZ) MEMS transducer/accelerometer having a caddie-corner single proof mass 122 according to another embodiment of the present disclosure. Caddie-corner single proof mass 122 is similar to caddie-corner single proof mass 42 as discussed herein above, with the following differences. Proof mass 122 includes a main body portion of a conductive material, generally indicated by reference numeral 124, and an extra mass caddie-corner portion, generally indicated by reference numeral 126 positioned about a corner 128 of the proof mass 122. The extra mass caddie-corner portion 126 includes more of the same conductive material of the main body portion 124, and spans a corner between a first side edge 130 and a second side edge 132 of proof mass 122. The extra mass caddie-corner portion 126 may only comprise or may further comprise additional material, similarly as illustrated and discussed with respect additional material 110 of FIG. 5. Extra mass caddie-corner portion 126 provides for an added weight to the proof mass 122 in a corner thereof for z-sense, wherein z-axis sensing occurs diagonally from corner to corner, similarly as explained herein with reference to caddie- corner proof mass 42.

In addition, the main body portion 124 of proof mass 122 includes two reduced corners, indicated by reference numerals 134 and 136. Reduced corners 134 and 136 are centered on the z-sense pivot axis 70. Each reduced corner features sufficient material for attachment of a corresponding spring 64 and 68, respectively, but less material than a complete corner. As a result, the caddie-corner proof mass 122 includes a distribution of mass having a shape which is generally more well-defined in a direction extending perpendicular with the z-sense pivot axis as illustrated in FIG. 6.

As illustrated in FIG. 6, the caddie-corner proof mass 122 is generally disposed in the x-y plane as denoted via the x and y axes 28 and 30, respectively. In addition, the caddie-corner portion 126 is disposed at an angle 138 with respect to the x-axis 28, wherein the angle 138 is less than 90 degrees. In addition, the caddie-corner portion 126 is disposed at an angle 140 with respect to the y-axis 140, wherein the angle 140 is less than 90 degrees. The sum of angle 138 and 140 is less than 90 degrees. In one embodiment, angle 138 and angle 140 comprise 45 degrees.

According to one aspect, the caddie-corner proof mass of the present disclosure advantageously provides for teeter-tottering out-of-plane from x and y, and more particularly, 45 degrees off axis from x and y (i.e., 45 degrees off axis from the x and y sense axes).

By now it should be appreciated that there has been provided a three-axis MEMS transducer/accelerometer featuring a caddie-corner proof mass, the proof mass comprising: a planar main body portion of conductive material, the main body portion having a width and a length dimension and at least four side edges, wherein an x-axis sense direction is defined from a first side edge to an opposite first side edge and a y-axis sense direction is defined from a second side edge to an opposite second side edge, the x-axis sense direction being perpendicular to the y-axis sense direction, the main body portion further having at least two corners; and a planar extra mass caddie-corner feature positioned about at least one of the two corners of the main body portion, wherein the extra mass caddie-corner feature and the main body portion comprise a single caddie-corner proof mass having a z-sense pivot axis disposed at an angle of ninety degrees to a diagonal extending from the extra mass caddie-corner feature to an opposite corner of the main body portion, wherein the proof mass is configured to teeter-totter corner to corner about the z-sense pivot axis in response to one of a z-axis acceleration and a z-axis deceleration.

In one embodiment, the planar main body portion includes four corners, wherein the extra mass caddie-corner feature is disposed on a diagonal extending between a first one of the four corners and a third one of the four corners, and wherein the z-sense pivot axis is defined along a diagonal extending between a second one of the four corners and a fourth one of the four corners. In another embodiment, the second one of the four corners and the fourth one of the four corners comprise reduced corners.

According to another embodiment, the planar main body portion of conductive material further comprises (i) at least two pair of x-axis sense openings, wherein one pair is disposed in a first half of the main body portion of conductive material along the x-axis sense direction and the other pair is disposed in a second half of the main body portion along the x-axis sense direction opposite the first half, and (ii) at least two pair of y-axis sense openings in a first half of the main body portion of conductive material along the y-axis sense direction and the other pair is disposed in a second half of the main body portion along the y-axis sense direction opposite the first half. The transducer further comprises a substrate including at least two pairs of x-axis sense plates, at least two pairs of y-axis sense plates, and at least two z-axis sense plates. The transducer still further comprises four springs coupled between the substrate and the main body portion, wherein the at least two pairs of x-axis sense plates align to and are positioned within the at least two pair of x-axis sense openings, the at least two pairs of y-axis sense plates align to and are positioned within the at least two pair of y-axis sense openings, and the at least two z-axis sense plates align with the extra mass caddie-corner feature and the corresponding opposite corner of the main body portion.

In another embodiment, the four springs comprise planar springs, each planar spring configured to allow movement of the main body portion and the extra mass caddie-corner feature (i) in an x-axis sense direction in response to at least one of an x-axis acceleration and an x-axis deceleration, (ii) in a y-axis sense direction in response to at least one of a y-axis acceleration and a y-axis deceleration, and (i) in a z-axis sense direction about the z-sense pivot axis in response to at least one of a z-axis acceleration and a z-axis deceleration.

In yet another embodiment, the z-sense pivot axis comprises a well-defined pivot axis disposed within the planar main body portion of conductive material at an angle of forty-five degrees from the x-axis and at an angle of forty-five degrees from the y-axis. In addition, the z-sense pivot axis passes through a central point of the main body portion.

In a still further embodiment, the caddie-corner feature comprises a length portion that extends along an adjacent side edge by an amount less than or equal to one-half of a maximum length of a side edge of the main body portion. In another embodiment, the caddie-corner feature comprises a width portion that extends from an adjacent side edge by an amount less than or equal to one-third of a maximum length of a side edge of the main body portion. Still further, additional mass overlies the caddie-corner portion.

In a further embodiment, the extra mass caddie-corner feature is disposed in the x-y plane at an angle less than ninety degrees off-axis from the x-axis sense direction and at an angle less than ninety degrees off-axis from the y-axis sense direction. Still further, the extra mass caddie-corner feature is disposed at an angle of forty-five degrees off-axis from the x-axis sense direction and at an angle of forty-five degrees off-axis from the y-axis sense direction.

In another embodiment, a three-axis MEMS transducer includes a caddie-corner proof mass, a substrate, and four springs. The proof mass includes a planar main body portion of conductive material and a planar extras mass caddie-corner feature. The planar main body portion has a width and a length dimension and at least four side edges, wherein an x-axis sense direction is defined from a first side edge to an opposite first side edge and a y-axis sense direction is defined from a second side edge to an opposite second side edge, the x-axis sense direction being perpendicular to the y-axis sense direction, the main body portion further having at least two corners. The planar extra mass caddie-corner feature is positioned about at least one of the two corners of the main body portion, wherein the extra mass caddie-corner feature and the main body portion comprise a single caddie-corner proof mass having a z-sense pivot axis disposed at an angle of ninety degrees to a diagonal extending from the extra mass caddie-corner feature to an opposite corner of the main body portion. Accordingly, the proof mass is configured to teeter-totter corner to corner about the z-sense pivot axis in response to one of a z-axis acceleration and a z-axis deceleration.

In another embodiment, the planar main body portion includes four corners. In addition, the extra mass caddie-corner feature is disposed on a diagonal extending between a first one of the four corners and a third one of the four corners, and wherein the z-sense pivot axis is defined along a diagonal extending between a second one of the four corners and a fourth one of the four corners. The planar main body portion of conductive material further comprises (i) at least two pair of x-axis sense openings, wherein one pair is disposed in a first half of the main body portion of conductive material along the x-axis sense direction and the other pair is disposed in a second half of the main body portion along the x-axis sense direction opposite the first half, and (ii) at least two pair of y-axis sense openings in a first half of the main body portion of conductive material along the y-axis sense direction and the other pair is disposed in a second half of the main body portion along the y-axis sense direction opposite the first half. The substrate includes at least two pairs of x-axis sense plates, at least two pairs of y-axis sense plates, and at least two z-axis sense plates. The four springs are coupled between the substrate and the main body portion, wherein the at least two pairs of x-axis sense plates align to and are positioned within the at least two pair of x-axis sense openings, the at least two pairs of y-axis sense plates align to and are positioned within the at least two pair of y-axis sense openings, and the at least two z-axis sense plates align with the extra mass caddie-corner feature and the corresponding opposite corner of the main body portion.

In a further embodiment, the four springs comprise planar springs, each planar spring configured to allow movement of the main body portion and the extra mass caddie-corner feature (i) in an x-axis sense direction in response to at least one of an x-axis acceleration and an x-axis deceleration, (ii) in a y-axis sense direction in response to at least one of a y-axis acceleration and a y-axis deceleration, and (i) in a z-axis sense direction about the z-sense pivot axis in response to at least one of a z-axis acceleration and a z-axis deceleration. Still further, the z-sense pivot axis comprises a well-defined pivot axis disposed within the planar main body portion of conductive material at an angle of forty-five degrees from the x-axis and at an angle of forty-five degrees from the y-axis. Yet still further, the caddie-corner feature comprises a length portion that extends along an adjacent side edge by an amount less than or equal to one-half of a maximum length of a side edge of the main body portion, and wherein the caddie-corner feature comprises a width portion that extends from an adjacent side edge by an amount less than or equal to one-third of a maximum length of a side edge of the main body portion. In another embodiment, the extra mass caddie-corner feature can be disposed in the x-y plane at an angle of forty-five degrees off-axis from the x-axis sense direction and at an angle of forty-five degrees off-axis from the y-axis sense direction. The second one of the four corners and the fourth one of the four corners can comprise reduced corners.

According to yet another embodiment, a three-axis MEMS transducer features a caddie-corner proof mass, a substrate, and four springs. The proof mass comprises a planar main body portion of conductive material and a planar extra mass caddie-corner feature. The main body portion has a width and a length dimension and at least four side edges. An x-axis sense direction is defined from a first side edge to an opposite first side edge and a y-axis sense direction is defined from a second side edge to an opposite second side edge, the x-axis sense direction being perpendicular to the y-axis sense direction. The main body portion further includes at least two corners.

The planar extra mass caddie-corner feature is positioned about at least one of the two corners of the main body portion, wherein the extra mass caddie-corner feature and the main body portion comprise a single proof mass having a z-sense pivot axis disposed at an angle of ninety degrees to a diagonal extending from the extra mass caddie-corner feature to an opposite corner of the main body portion. The proof mass is configured to teeter-totter corner to corner about the z-sense pivot axis in response to one of a z-axis acceleration and a z-axis deceleration. The z-sense pivot axis thus comprises a well-defined pivot axis disposed within the planar main body portion of conductive material at an angle of forty-five degrees from the x-axis and at an angle of forty-five degrees from the y-axis, further wherein the z-sense pivot axis passes through a central point of the main body portion.

The extra mass caddie-corner feature further comprises a length portion that extends along an adjacent side edge by an amount less than or equal to one-half of a maximum length of a side edge of the main body portion. In addition, the extra mass caddie-corner feature comprises a width portion that extends from an adjacent side edge by an amount less than or equal to one-third of a maximum length of a side edge of the main body portion. Still further, the extra mass caddie-corner feature is disposed in the x-y plane at an angle of forty-five degrees off-axis from the x-axis sense direction and at an angle of forty-five degrees off-axis from the y-axis sense direction.

The planar main body portion further includes four corners, wherein the extra mass caddie-corner feature is disposed on a diagonal extending between a first one of the four corners and a third one of the four corners, and wherein the z-sense pivot axis is defined along a diagonal extending between a second one of the four corners and a fourth one of the four corners. The planar main body portion of conductive material still further comprises (i) at least two pair of x-axis sense openings, wherein one pair is disposed in a first half of the main body portion of conductive material along the x-axis sense direction and the other pair is disposed in a second half of the main body portion along the x-axis sense direction opposite the first half, and (ii) at least two pair of y-axis sense openings in a first half of the main body portion of conductive material along the y-axis sense direction and the other pair is disposed in a second half of the main body portion along the y-axis sense direction opposite the first half. The substrate includes at least two pairs of x-axis sense plates, at least two pairs of y-axis sense plates, and at least two z-axis sense plates. The four springs are coupled between the substrate and the main body portion, wherein the at least two pairs of x-axis sense plates align to and are positioned within the at least two pair of x-axis sense openings, the at least two pairs of y-axis sense plates align to and are positioned within the at least two pair of y-axis sense openings, and the at least two z-axis sense plates align with the extra mass caddie-corner feature and the corresponding opposite corner of the main body portion.

In one embodiment, the four springs comprise planar springs, each planar spring is configured to allow movement of the main body portion and the extra mass caddie-corner feature (i) in an x-axis sense direction in response to at least one of an x-axis acceleration and an x-axis deceleration, (ii) in a y-axis sense direction in response to at least one of a y-axis acceleration and a y-axis deceleration, and (i) in a z-axis sense direction about the z-sense pivot axis in response to at least one of a z-axis acceleration and a z-axis deceleration. In addition, the second one of the four corners and the fourth one of the four corners can comprise reduced corners.

Because apparatus for implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in -the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A three-axis MEMS transducer featuring a caddie-corner proof mass, the proof mass comprising:
   a planar main body portion of conductive material, the main body portion having a width and a length dimension and at least four side edges, wherein an x-axis sense direction is defined from a first side edge to an opposite first side edge and a y-axis sense direction is defined from a second side edge to an opposite second side edge, the x-axis sense direction being perpendicular to the y-axis sense direction, the main body portion further having at least two corners, wherein a first corner of the at least two corners is positioned opposite a second corner of the at least two corners; and
   a planar extra mass caddie-corner feature positioned about the first corner of the main body portion, wherein the extra mass caddie-corner feature and the main body portion comprise a single caddie-corner proof mass having a z-sense pivot axis disposed at an angle of ninety degrees to a diagonal extending from the extra mass corner feature to the second corner of the main body portion, wherein the proof mass is configured to teeter-totter corner to corner about the z-sense pivot axis in response to one of a z-axis acceleration and a z-axis deceleration, and wherein the planar extra mass caddie-corner feature is positioned farther from the z-sense pivot axis than the second corner of the planar main body.

2. The transducer of claim 1, wherein the planar main body portion further comprises a third corner and a fourth corner, wherein the third corner is opposite the fourth corner, and wherein the z-sense pivot axis is defined along a diagonal extending between the third corner and the fourth corner.

3. The transducer of claim 2, further wherein the third and fourth corners comprise reduced corners.

4. The transducer of claim 1, wherein the planar main body portion of conductive material further comprises (i) at least two pair of x-axis sense openings, wherein one pair is disposed in a first half of the main body portion of conductive material along the x-axis sense direction and the other pair is disposed in a second half of the main body portion along the x-axis sense direction opposite the first half, and (ii) at least two pair of y-axis sense openings in a first half of the main body portion of conductive material along the y-axis sense direction and the other pair is disposed in a second half of the main body portion along the y-axis sense direction opposite the first half, the transducer further comprising:
   a substrate including at least two pairs of x-axis sense plates, at least two pairs of y-axis sense plates, and at least two z-axis sense plates; and
   four springs coupled between the substrate and the main body portion, wherein the at least two pairs of x-axis sense plates align to and are positioned within the at least two pair of x-axis sense openings, the at least two pairs of y-axis sense plates align to and are positioned within the at least two pair of y-axis sense openings, and the at least two z-axis sense plates align with the extra mass caddie-corner feature and the corresponding opposite corner of the main body portion.

5. The transducer of claim 4, wherein the four springs comprise planar springs, each planar spring configured to allow movement of the main body portion and the extra mass corner feature (i) in an x-axis sense direction in response to at least one of an x-axis acceleration and an x-axis deceleration, (ii) in a y-axis sense direction in response to at least one of a y-axis acceleration and a y-axis deceleration, and (i) in a z-axis sense direction about the z-sense pivot axis in response to at least one of a z-axis acceleration and a z-axis deceleration.

6. The transducer of claim 1, wherein the z-sense pivot axis comprises a well-defined pivot axis disposed within the planar main body portion of conductive material at an angle of forty-five degrees from the x-axis and at an angle of forty-five degrees from the y-axis.

7. The transducer of claim 6, further wherein the z-sense pivot axis passes through a central point of the main body portion.

8. The transducer of claim 1, wherein the caddie-corner feature comprises a length portion that extends along an adjacent side edge by an amount less than or equal to one-half of a maximum length of a side edge of the main body portion.

9. The transducer of claim 1, wherein the caddie-corner feature comprises a width portion that extends from an adjacent side edge by an amount less than or equal to one-third of a maximum length of a side edge of the main body portion.

10. The transducer of claim 1, further comprising: additional mass overlying the caddie-corner feature.

11. The transducer of claim 1, wherein the extra mass caddie-corner feature is disposed in the x-y plane at an angle less than ninety degrees off-axis from the x-axis sense direction and at an angle less than ninety degrees off-axis from the y-axis sense direction.

12. The transducer of claim 1, further wherein the extra mass caddie-corner feature is disposed at an angle of forty-five degrees off-axis from the x-axis sense direction and at an angle of forty-five degrees off-axis from the y-axis sense direction.

13. A three-axis MEMS transducer featuring a caddie-corner proof mass, the proof mass comprising:
a planar main body portion of conductive material, the main body portion having a width and a length dimension and at least four side edges, wherein an x-axis sense direction is defined from a first side edge to an opposite first side edge and a y-axis sense direction is defined from a second side edge to an opposite second side edge, the x-axis sense direction being perpendicular to the y-axis sense direction, the main body portion further having at least two corners; and
a planar extra mass caddie-corner feature positioned about at least one of the two corners of the main body portion, wherein the extra mass caddie-corner feature and the main body portion comprise a single caddie-corner proof mass having a z-sense pivot axis disposed at an angle of ninety degrees to a diagonal extending from the extra mass corner feature to an opposite corner of the main body portion, wherein the proof mass is configured to teeter-totter corner to corner about the z-sense pivot axis in response to one of a z-axis acceleration and a z-axis deceleration, wherein the planar main body portion includes four corners, wherein the extra mass caddie-corner feature is disposed on a diagonal extending between a first one of the four corners and a third one of the four corners, wherein the extra mass caddie-corner feature is positioned at the first one of the four corners and is farther from the z-sense pivot axis than the third one of the four corners, and wherein the z-sense pivot axis is defined along a diagonal extending between a second one of the four corners and a fourth one of the four corners, wherein the planar main body portion of conductive material further comprises (i) at least two pair of x-axis sense openings, wherein one pair is disposed in a first half of the main body portion of conductive material along the x-axis sense direction and the other pair is disposed in a second half of the main body portion along the x-axis sense direction opposite the first half, and (ii) at least two pair of y-axis sense openings in a first half of the main body portion of conductive material along the y-axis sense direction and the other pair is disposed in a second half of the main body portion along the y-axis sense direction opposite the first half, the transducer further comprising:
a substrate including at least two pairs of x-axis sense plates, at least two pairs of y-axis sense plates, and at least two z-axis sense plates; and
four springs coupled between the substrate and the main body portion, wherein the at least two pairs of x-axis sense plates align to and are positioned within the at least two pair of x-axis sense openings, the at least two pairs of y-axis sense plates align to and are positioned within the at least two pair of y-axis sense openings, and the at least two z-axis sense plates align with the extra mass caddie-corner feature and the corresponding opposite corner of the main body portion.

14. The transducer of claim 13, wherein the four springs comprise planar springs, each planar spring configured to allow movement of the main body portion and the extra mass caddie-corner feature (i) in an x-axis sense direction in response to at least one of an x-axis acceleration and an x-axis deceleration, (ii) in a y-axis sense direction in response to at least one of a y-axis acceleration and a y-axis deceleration, and (i) in a z-axis sense direction about the z-sense pivot axis in response to at least one of a z-axis acceleration and a z-axis deceleration.

15. The transducer of claim 14, wherein the z-sense pivot axis comprises a well-defined pivot axis disposed within the planar main body portion of conductive material at an angle of forty-five degrees from the x-axis and at an angle of forty-five degrees from the y-axis.

16. The transducer of claim 15, wherein the caddie-corner feature comprises a length portion that extends along an adjacent side edge by an amount less than or equal to one-half of a maximum length of a side edge of the main body portion, and wherein the caddie-corner feature comprises a width portion that extends from an adjacent side edge by an amount less than or equal to one-third of a maximum length of a side edge of the main body portion.

17. The transducer of claim 16, wherein the extra mass caddie-corner feature is disposed in the x-y plane at an angle of forty-five degrees off-axis from the x-axis sense direction and at an angle of forty-five degrees off-axis from the y-axis sense direction.

18. The transducer of claim 17, further wherein the second one of the four corners and the fourth one of the four corners comprise reduced corners.

19. A three-axis MEMS transducer featuring a caddie-corner proof mass, the proof mass comprising:
a planar main body portion of conductive material, the main body portion having a width and a length dimension and at least four side edges, wherein an x-axis sense direction is defined from a first side edge to an opposite first side edge and a y-axis sense direction is defined from a second side edge to an opposite second side edge, the x-axis sense direction being perpendicular to the y-axis sense direction, the main body portion further having at least two corners;
a planar extra mass caddie-corner feature positioned about at least one of the two corners of the main body portion, wherein the extra mass caddie-corner feature and the main body portion comprise a single proof mass having a z-sense pivot axis disposed at an angle of ninety degrees to a diagonal extending from the extra mass caddie-corner feature to an opposite corner of the main body portion, wherein the proof mass is configured to teeter-totter corner to corner about the z-sense pivot axis in response to one of a z-axis acceleration and a z-axis deceleration, wherein the z-sense pivot axis comprises a well-defined pivot axis disposed within the planar main body portion of conductive material at an angle of forty-five degrees from the x-axis and at an angle of forty-five degrees from the y-axis, further wherein the z-sense pivot axis passes through a central point of the main body portion, wherein the extra mass caddie-corner feature comprises a length portion that extends along an adjacent side edge by an amount less than or equal to one-half of a maximum length of a side edge of the main body portion, wherein the extra mass caddie-corner feature comprises a width portion that extends from an adjacent side edge by an amount less than or equal to one-third of a maximum length of a side edge of the main body portion, further wherein the extra mass caddie-corner feature is disposed in the x-y plane at an angle of forty-five degrees off-axis from the x-axis sense direction and at an angle of forty-five degrees off-axis from the y-axis sense direction, wherein the planar main body portion includes four corners, wherein the extra mass caddie-corner feature is disposed on a diagonal extending between a first one of the four corners and a third one of the four corners, wherein the extra mass caddie-corner feature is positioned at the first one of the four corners and is farther from the z-sense pivot axis than the third one of the four corners, and wherein the z-sense pivot axis is defined along a diagonal extending between a second one of the four corners and a fourth one of the four corners, wherein the planar main body portion of conductive material further comprises (i) at least two pair of x-axis sense openings, wherein one pair is disposed in a first half of the main body portion of conductive material along the x-axis sense direction and the other pair is disposed in a second half of the main body portion along the x-axis sense direction opposite the first half, and (ii) at least two pair of y-axis sense openings in a first half of the main body portion of conductive material along the y-axis sense direction and the other pair is disposed in a second half of the main body portion along the y-axis sense direction opposite the first half;

a substrate including at least two pairs of x-axis sense plates, at least two pairs of y-axis sense plates, and at least two z-axis sense plates; and four springs coupled between the substrate and the main body portion, wherein the at least two pairs of x-axis sense plates align to and are positioned within the at least two pair of x-axis sense openings, the at least two pairs of y-axis sense plates align to and are positioned within the at least two pair of y-axis sense openings, and the at least two z-axis sense plates align with the extra mass caddie-corner feature and the corresponding opposite corner of the main body portion, wherein the four springs comprise planar springs, each planar spring configured to allow movement of the main body portion and the extra mass caddie-corner feature (i) in an x-axis sense direction in response to at least one of an x-axis acceleration and an x-axis deceleration, (ii) in a y-axis sense direction in response to at least one of a y-axis acceleration and a y-axis deceleration, and (i) in a z-axis sense direction about the z-sense pivot axis in response to at least one of a z-axis acceleration and a z-axis deceleration.

20. The transducer of claim 19, further wherein the second one of the four corners and the fourth one of the four corners comprise reduced corners.

* * * * *